United States Patent
Lee et al.

(10) Patent No.: US 12,341,634 B2
(45) Date of Patent: Jun. 24, 2025

(54) METHOD AND APPARATUS FOR TRANSMITTING AND RECEIVING SC-FDE SIGNAL IN SINGLE CARRIER-BASED WIRELESS COMMUNICATION SYSTEM

(71) Applicants: AGENCY FOR DEFENSE DEVELOPMENT, Daejeon (KR); Hanbat National University Industry-Academic Cooperation Foundation, Daejeon (KR); AJOU UNIVERSITY INDUSTRY-ACADEMIC COOPERATION FOUNDATION, Suwon-si (KR)

(72) Inventors: Jae Seang Lee, Daejeon (KR); Sung Min Lee, Daejeon (KR); Joo Hang Son, Daejeon (KR); Soo Ii Kim, Daejeon (KR); Eui Rim Jeong, Daejeon (KR); Kyung Woo Kim, Daejeon (KR); Jae Hyun Kim, Suwon-si (KR)

(73) Assignees: AGENCY FOR DEFENSE DEVELOPMENT, Daejeon (KR); Hanbat National University Industry-Academic Cooperation Foundation, Daejeon (KR); ANJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 18/527,898

(22) Filed: Dec. 4, 2023

(65) Prior Publication Data
US 2024/0187287 A1 Jun. 6, 2024

(30) Foreign Application Priority Data
Dec. 5, 2022 (KR) .......... 10-2022-0168166

(51) Int. Cl.
*H04L 25/03* (2006.01)
*H04L 27/26* (2006.01)

(52) U.S. Cl.
CPC .... *H04L 25/03159* (2013.01); *H04L 27/2607* (2013.01)

(58) Field of Classification Search
CPC .............. H04L 25/03159; H04L 27/2607; H04L 27/26
See application file for complete search history.

(56) References Cited

U.S. PATENT DOCUMENTS

| | | | |
|---|---|---|---|
| 2003/0169824 A1* | 9/2003 | Chayat | H04L 5/023 375/260 |
| 2007/0201569 A1* | 8/2007 | Pajukoski | H04L 27/2647 375/260 |
| 2012/0195399 A1* | 8/2012 | Zhu | H04L 27/2636 375/341 |

* cited by examiner

*Primary Examiner* — Sung S Ahn
(74) *Attorney, Agent, or Firm* — Knobbe, Martens, Olson & Bear, LLP

(57) ABSTRACT

A transmission apparatus of a single carrier-based wireless communication system is proposed. The transmission apparatus may include a transceiver, a memory configured to store one or more instructions; and a processor configured to execute the one or more instructions stored in the memory. The processor may generate data symbols by modulating traffic data, generate a cyclic prefix (CP) on the basis of the data symbols, and generate a pilot symbol for the data symbol. The transceiver may transmit a single carrier frequency domain equalizer (SC-FDE) frame including the data symbol, the CP, and the pilot symbol. The data symbols may include first data symbols and second data symbols. The pilot symbol may be transmitted after transmission of the first data symbols and before transmission of the second data symbols.

14 Claims, 9 Drawing Sheets

METHOD AND APPARATUS FOR TRANSMITTING AND RECEIVING SC-FDE SIGNAL IN SINGLE CARRIER-BASED WIRELESS COMMUNICATION SYSTEM

CROSS-REFERENCE TO RELATED APPLICATION

This application claims priority to Korean Patent Application No. 10-2022-0168166 filed on Dec. 5, 2022. The entire contents of the application on which the priority is based are incorporated herein by reference.

BACKGROUND

Technical Field

The present disclosure relates to a single carrier-based wireless communication system, and to a single carrier frequency domain equalizer (SC-FDE)-based transmission and a reception method and a device capable of effectively estimating a channel environment and enhancing data reception performance in a high-speed mobile communication environment in which a low output is used.

Description of Related Technology

A signal with a wide bandwidth should be used to transmit data at a high speed in a multipath fading environment, and channel equalization is important to compensate for distortion of a fading channel.

SUMMARY

One aspect is an SC-FDE-based transmission and reception method and device capable of effectively estimating and compensating for channels in a single carrier-based wireless communication system.

Another aspect is an SC-FDE-based transmission and reception method and device capable of maintaining link performance in a high-speed mobile environment without reducing the number of symbols transmitted in one frame in a single carrier-based wireless communication system.

Another aspect is an SC-FDE-based transmission and reception method and device that secures a link budget margin and is robust to noise interference.

Another aspect is a data transmitting apparatus of a single carrier-based wireless communication system, the apparatus comprising: a transceiver; a memory configured to store one or more instructions; and a processor configured to execute the one or more instructions stored in the memory, wherein the instructions, when executed by the processor, cause the processor to: generate data symbols by modulating traffic data; generate a cyclic prefix (CP) on the basis of the data symbols; and generate a pilot symbol for the data symbol, wherein the transceiver is configured to transmit a single carrier frequency domain equalizer (SC-FDE) frame including the data symbol, the CP, and the pilot symbol, wherein the data symbols include first data symbols and second data symbols, and wherein the pilot symbol is transmitted after transmission of the first data symbols and before transmission of the second data symbols.

The number of first data symbols may be equal to the number of second data symbols.

The data symbols may be divided into the first data symbols and the second data symbols, and the pilot symbol may be disposed between the first data symbol and the second data symbol in the SC-FDE frame.

The processor may be configured to generate the CP on the basis of the second data symbol.

The transceiver may be configured to construct the SC-FDE frame so that the SC-FDE frame sequentially includes the CP, the first data symbol, the pilot symbol, and the second data symbol.

Another aspect is a data transmitting method to be performed by a data transmitting apparatus of a single carrier-based wireless communication system, the method comprising: generating data symbols by modulating traffic data and generating a pilot symbol for the data symbols; generating a cyclic prefix (CP) on the basis of the data symbol; and generating a single carrier frequency domain equalizer (SC-FDE) frame including the data symbols, the CP, and the pilot symbol, wherein the data symbols include first data symbols and second data symbols, and wherein the pilot symbol is transmitted after transmission of the first data symbols and before transmission of the second data symbols. The number of first data symbols may be equal to the number of second data symbols.

The CP may be generated on the basis of the second data symbol.

The method may comprise dividing the data symbols into the first data symbols and the second data symbols, wherein the pilot symbol may be disposed between the first data symbol and the second data symbol in the SC-FDE frame.

The transmitting may include generating the SC-FDE frame including the CP, the first data symbol, the pilot symbol, and the second data symbol which are sequentially arranged in the SC-FDE frame.

Another aspect is a non-transitory computer-readable recording medium storing a computer program, which comprises instructions for a processor to perform a data transmitting method, the method comprising: generating data symbols by modulating traffic data and generating a pilot symbol for the data symbols; generating a cyclic prefix (CP) on the basis of the data symbol; and generating a single carrier frequency domain equalizer (SC-FDE) frame including the data symbols, the CP, and the pilot symbol, wherein the data symbols include first data symbols and second data symbols, and wherein the pilot symbol is transmitted after transmission of the first data symbols and before transmission of the second data symbols.

Another aspect is a data receiving apparatus of a single carrier-based wireless communication system, the apparatus comprising: a transceiver configured to receive a single carrier frequency domain equalizer (SC-FDE) frame; a memory configured to store one or more instructions; and a processor configured to execute the one or more instructions stored in the memory, wherein the instructions, when executed by the processor, cause the processor to: remove a cyclic prefix (CP) from the SC-FDE frame; extract a pilot symbol and a data symbol from the SC-FDE frame from which the CP has been removed; and restore traffic data from the data symbol on the basis of the pilot symbol, wherein the data symbols include first data symbols and second data symbols, and wherein the pilot symbol is received after reception of the first data symbol and before reception of the second data symbol.

The number of first data symbols may be equal to the number of second data symbols.

The processor may be configured to separate the pilot symbol, the first data symbol, and the second data symbol from the SC-FDE frame from which the CP has been removed.

The SC-FDE frame includes the CP, the first data symbol, the pilot symbol, and the second data symbol which are sequentially arranged in the SC-FDE frame.

Another aspect is a data receiving method to be performed by a data receiving apparatus of a single carrier-based wireless communication system, the method comprising: receiving a single carrier frequency domain equalizer (SC-FDE) frame; removing a cyclic prefix (CP) from the SC-FDE frame; extracting a pilot symbol and a data symbol from the SC-FDE frame from which the CP has been removed; and restoring traffic data from the data symbol on the basis of the pilot symbol, wherein the data symbols include first data symbols and second data symbols, and wherein the pilot symbol is received after reception of the first data symbol and before reception of the second data symbol.

Another aspect is a non-transitory computer-readable recording medium storing a computer program, which comprises instructions for a processor to perform a data receiving method, the method comprising: receiving a single carrier frequency domain equalizer (SC-FDE) frame; removing a cyclic prefix (CP) from the SC-FDE frame; extracting a pilot symbol and a data symbol from the SC-FDE frame from which the CP has been removed; and restoring traffic data from the data symbol on the basis of the pilot symbol, wherein the data symbols include first data symbols and second data symbols, and wherein the pilot symbol is received after reception of the first data symbol and before reception of the second data symbol.

The aspects of the present disclosure are not limited to the foregoing, and other aspects not mentioned herein will be clearly understood by those skilled in the art from the following description.

According to an embodiment of the present disclosure, since the pilot section is disposed between traffic data sections within the SC-FDE frame, a time difference between the pilot section and the traffic data section is reduced, thereby effectively compensating for an error in channel estimation.

According to an embodiment of the present disclosure, since the pilot section can represent the entire channel even in a high-speed mobile environment, it is possible to maintain link performance in the high-speed mobile environment without reducing the number of symbols transmitted in one frame.

According to an embodiment of the present disclosure, since transmission efficiency can be enhanced by using a low modulation and coding scheme (MCS) even in the high-speed mobile environment, this is advantageous in securing the link budget margin and withstanding noise interference.

DETAILED DESCRIPTION

Among various wireless communication schemes, an orthogonal frequency division multiplexing (OFDM) scheme can effectively compensate for channel distortion in a mobile communication environment, but there is a problem that power efficiency of a power amplifier is low since back off (B.O) of 10 dB or more is required due to poor peak to average power rate (PAPR) performance.

Figure 1:
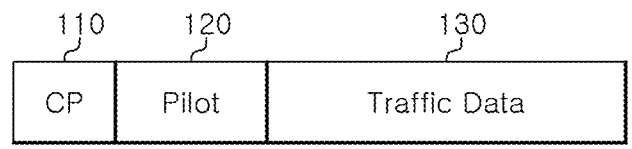
FIG. 1 is a diagram illustrating a structure of an existing SC-FDE frame.

There is an SC-FDE scheme as a transmission scheme for enhancing a high PAPR, which is a disadvantage of the OFDM, while performing channel compensation in a frequency domain, similarly to the OFDM method. A frame transmitted in the SC-FDE scheme is generally formed of a CP (cyclic prefix) section 110, a pilot section 120, and a traffic data section 130 in this order in a time domain, as illustrated in FIG. 1. When a moving speed is low and a channel change is small, the SC-FDE frame with such a structure has sufficiently good performance in compensating for channel distortion by reflecting, in the traffic data section, channel characteristics measured in the pilot section. However, when the moving speed is high and the channel change is great, the channel characteristics estimated in the pilot section may not represent a channel in an entire SC-FDE section. This is because a channel state in a front part of the traffic data may be similar to a channel state estimated in the pilot section, but in a rear part of the traffic data, the channel estimated in the pilot section may be significantly different from an actual channel. A most intuitive method for solving this problem is a method of reducing a length of the SC-FDE frame. However, when the frame length is reduced, an overhead increases as a section occupied by the CP and the pilot in the entire transmission section becomes longer, which ultimately causes a problem of slowing down a data transmission speed.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Figure 2:
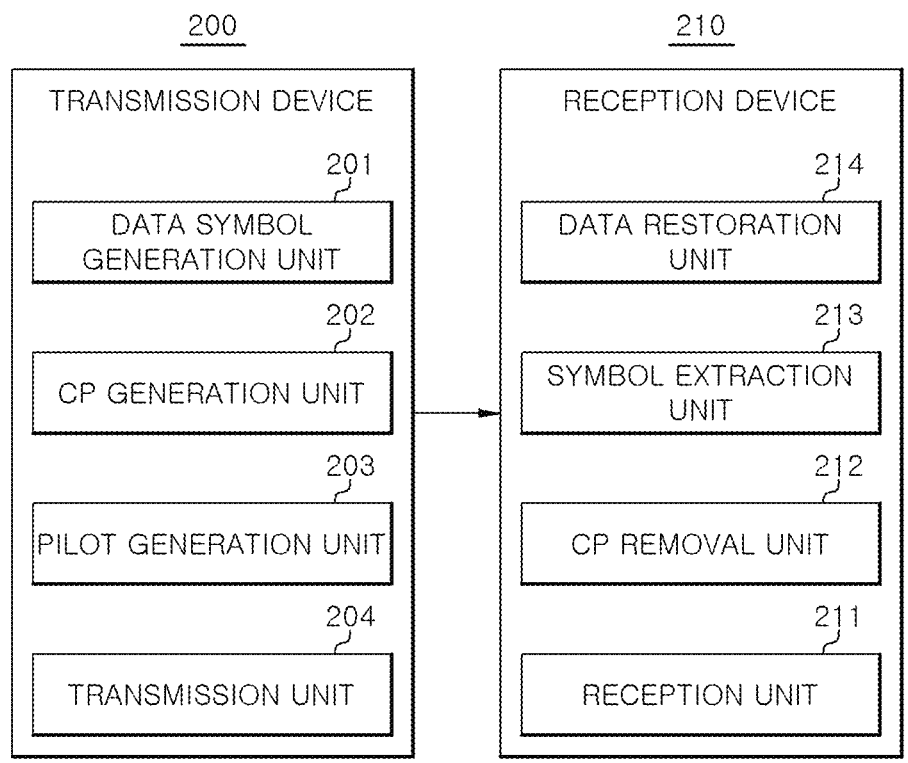
FIG. 2 is a diagram illustrating a single carrier-based wireless communication system according to an embodiment of the present disclosure.

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure. FIG. 2 is a diagram illustrating a single carrier-based wireless communication system according to an embodiment of the present disclosure.

Referring to FIG. 2, the single carrier-based wireless communication system according to the embodiment of the present disclosure includes a data transmitting apparatus 200 and a data receiving apparatus 210.

The data transmitting apparatus 200 may include a data symbol generation unit 201, a CP generation unit 202, a pilot generation unit 203, and a transmission unit 204.

The data symbol generation unit 201 may modulate traffic data to generate a data symbol. For example, the data symbol generation unit 201 may map the traffic data to a constellation to generate the data symbol on the basis of a modulation and coding scheme (MCS). In this case, the traffic data may be modulated using phase shift keying (PSK), quadrature amplitude modulation (QAM), or the like.

The CP generation unit 202 may generate the CP on the basis of the data symbol generated by the symbol generation unit 201. For example, the CP generation unit 202 may generate the CP using a rear part of the data symbol. The CP may be included in a beginning of the SC-FDE frame to prevent inter-symbol interference.

The pilot generation unit 203 may generate a pilot symbol for the data symbol generated by the data symbol generation unit 201. The pilot symbol is for channel estimation, and the data receiving apparatus 210 may use the pilot symbol to calculate a channel compensation coefficient and compensate for channel distortion.

The transmission unit 204 may form an SC-FDE frame including the data symbol generated in the data symbol generation unit 201, the CP generated in the CP generation unit 202, and the pilot symbol generated in the pilot generation unit 203, and transmit the SC-FDE frame to the data receiving apparatus 210 using at least one antenna and a radio frequency chain (RF chain). Here, the data symbol may include a first data symbol and a second data symbol. That is, the data symbol may be divided into the first data symbol and the second data symbol.

For example, the transmission unit 204 may dispose the pilot symbol between the first data symbol and the second data symbol when constructing the SC-FDE frame. That is, the transmission unit 204 may construct or reconstruct the SC-FDE frame so that the SC-FDE frame sequentially includes the CP, the first data symbol, the pilot symbol, and the second data symbol. Accordingly, the pilot symbol may be transmitted after the CP and the first data symbol are transmitted and before the second data symbol is transmitted. Here, the number of first data symbols may be the same as the number of second data symbols. That is, a transmission section of the first data symbol and a transmission section of the second data symbol may have the same length. In this case, because the pilot symbol is located in the middle of the SC-FDE frame, it is possible for the pilot symbol to represent a channel state of the SC-FDE frame, and for the reception device to estimate the channel state more accurately even in a high-speed mobile environment.

When the SC-FDE frame is constructed of the CP, the first data symbol, the pilot symbol, and the second data symbol in this order, the CP generation unit 202 may generate the CP on the basis of the second data symbol. For example, the CP generation unit 202 may copy a rear part of the second data symbol to generate the CP, and the CP may be placed in a front part of the first data symbol. Meanwhile, the data receiving apparatus 210 may include a reception unit 211, a CP removal unit 212, a symbol extraction unit 213, and a data restoration unit 214.

The reception unit 211 may receive an SC-FDE frame from the data transmitting apparatus 200. To this end, the reception unit 211 may include at least one antenna and an RF chain.

The CP removal unit 212 may remove the CP from the SC-FDE frame received from the reception unit 211.

The symbol extraction unit 213 may extract the pilot symbol and the data symbol from the SC-FDE frame from which the CP has been removed by the CP removal unit 212. Here, the data symbol may include a first data symbol and a second data symbol. In this case, the SC-FDE frame received by the data receiving apparatus 210 may sequentially include the CP, the first data symbol, the pilot symbol, and the second data symbol. That is, the CP, the first data symbol, the pilot symbol, and the second data symbol may be sequentially received in the data receiving apparatus 210.

The symbol extraction unit 213 may separate and extract the first data symbol, the pilot symbol, and the second data symbol from the SC-FDE frame from which the CP has been removed.

The data restoration unit 214 may restore the traffic data from the data symbol on the basis of the pilot symbol extracted by the symbol extraction unit 213. As an example, the data restoration unit 214 may estimate a channel impulse response on the basis of the pilot symbol, calculate a channel coefficient in a time domain, and calculate a channel compensation coefficient in a frequency domain on the basis of the channel coefficient in the time domain. The data restoration unit 214 may perform Fast Fourier Transform (FFT) on the data symbol and reflect the channel compensation coefficient in the data symbol subjected to FFT-processing to remove an influence of the channel. Thereafter, the data restoration unit 214 may perform inverse FFT (IFFT) on the data symbol in which the channel compensation coefficient has been reflected, to generate a channel-compensated data symbol in the time domain, and extract the traffic data from the data symbol.

The data symbol generation unit 201, the CP generation unit 202, the pilot generation unit 203, the transmission unit 204, the reception unit 211, the CP removal unit 212, the symbol extraction unit 213, and the data restoration unit 214 of the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment.

Although the embodiment of the present disclosure illustrates that the data symbol generation unit 201, the CP generation unit 202, the pilot generation unit 203, the transmission unit 204, the reception unit 211, the CP removal unit 212, the symbol extraction unit 213, and the data restoration unit 214 may be executed by computer program instructions, the present disclosure is not limited thereto and may be applied in various modifications. For example, the transmission unit 204 and reception unit 211 may be executed by a transceiver in a single carrier-based wireless communication system.

Figure 3:
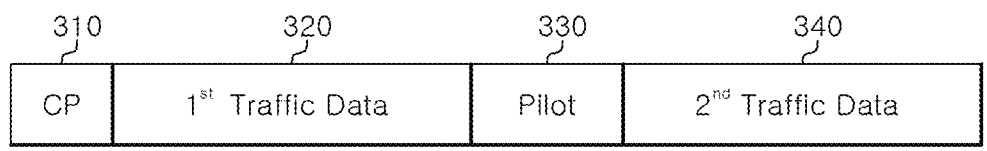
FIG. 3 is a diagram illustrating a structure of an SC-FDE frame according to the embodiment of the present disclosure.

FIG. 3 is a diagram illustrating a structure of the SC-FDE frame according to an embodiment of the present disclosure.

Referring to FIG. 3, the SC-FDE frame according to the embodiment of the present disclosure includes a CP section 310, a first traffic data section 320, a pilot section 330, and a second traffic data section 340. Therefore, in the SC-FDE frame according to the embodiment of the present disclosure, because a channel estimated in the pilot section 330 can represent an entire section of the SC-FDE, it is possible to estimate and compensate for channel more accurately even in a high-speed mobile environment without reducing a length (or number) of transmission symbols.

For example, in the case of FFT 512 samples, 32 symbols may be used as the CP, 64 symbols as the pilot, and 448 symbols as the traffic data. In this case, the first traffic data section 320 and the second traffic data section 340 may each include 224 data symbols, and the number of symbols included in the first traffic data section 320 and the second traffic data section 340 may be varied as necessary.

The transmission device may copy the 32 symbols included at an end of the second traffic data section 340 and store the symbols in first to 32nd storage devices of the SC-FDE frame. Here, the storage device may include a transmission queue.

Further, the transmission device may generate 64 pilot symbols and store the 64 pilot symbols in (32+224+1)th to (32+224+64)th storage devices of the SC-FDE frame. The transmission device may divide the data symbols into first data symbols and second data symbols, store the first data symbols in (32+1)th to (32+224)th storage devices of the SC-FDE frame, and store the second data symbols in last (32+224+64+10)th to (32+224+64+224)th storage devices of the SC-FDE frame. Through this process, the symbols stored in the storage devices may be sequentially output and transmitted to the reception device.

Figure 4:
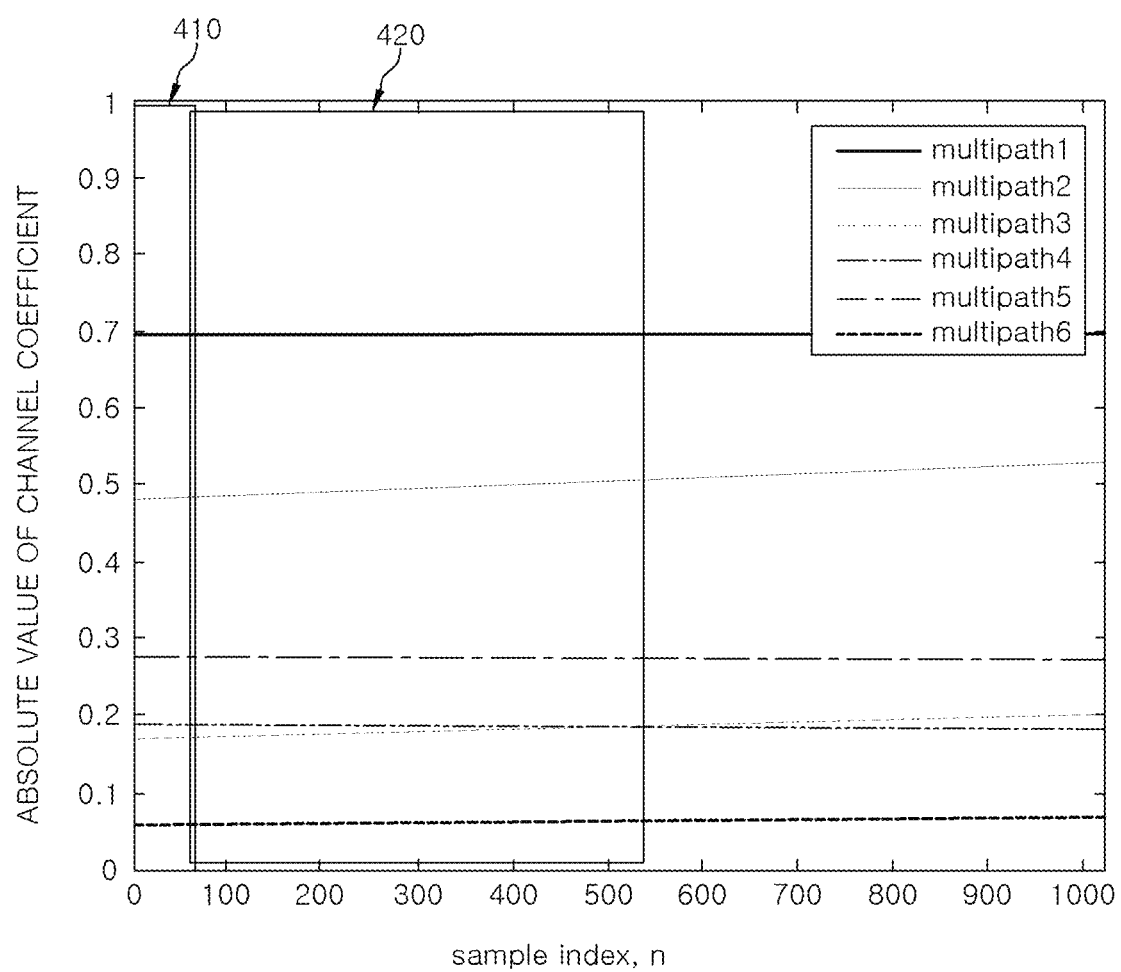
FIG. 4 is a diagram illustrating change in channel coefficient in an existing SC-FDE frame structure when a moving speed is 20 km/H.
Figure 5:
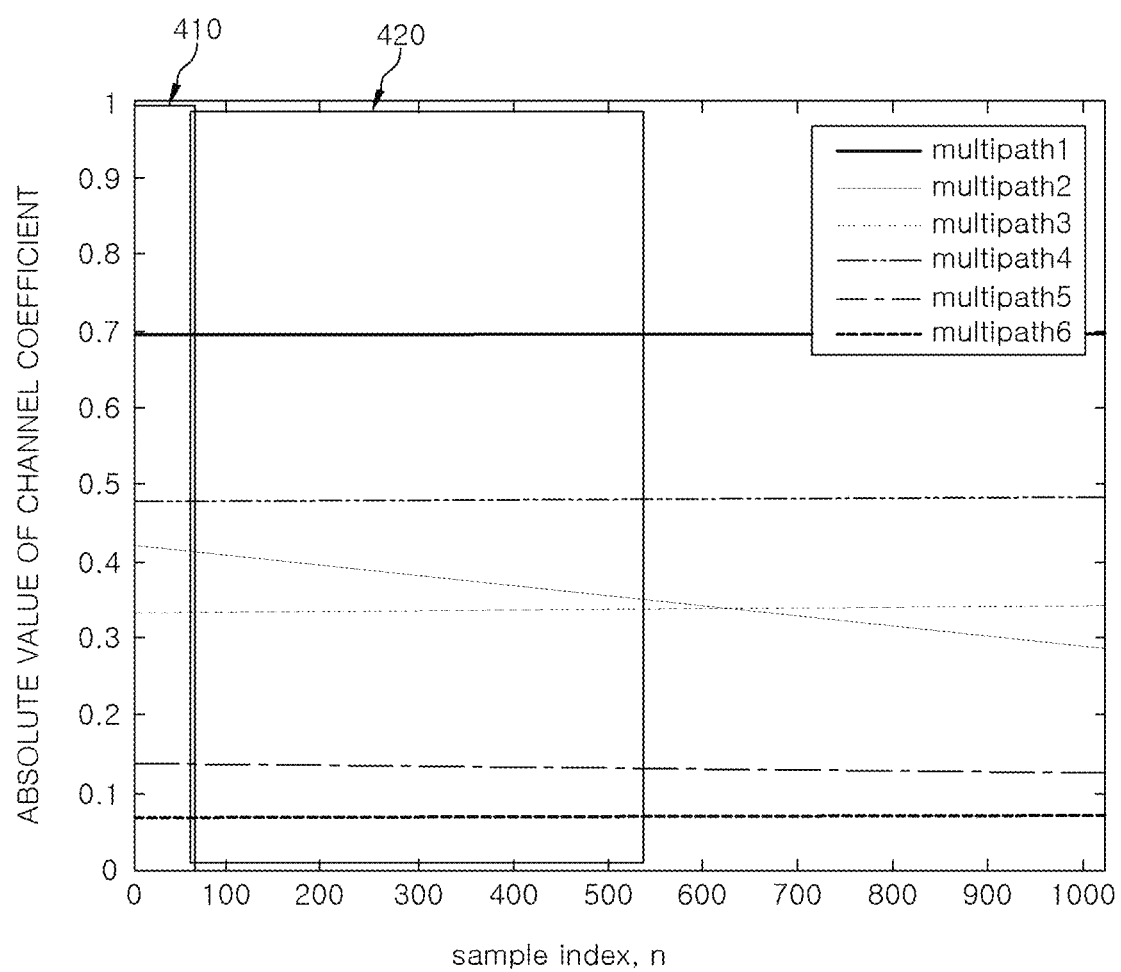
FIG. 5 is a diagram illustrating change in channel coefficient in the existing SC-FDE frame structure when the moving speed is 60 km/H.
Figure 6:
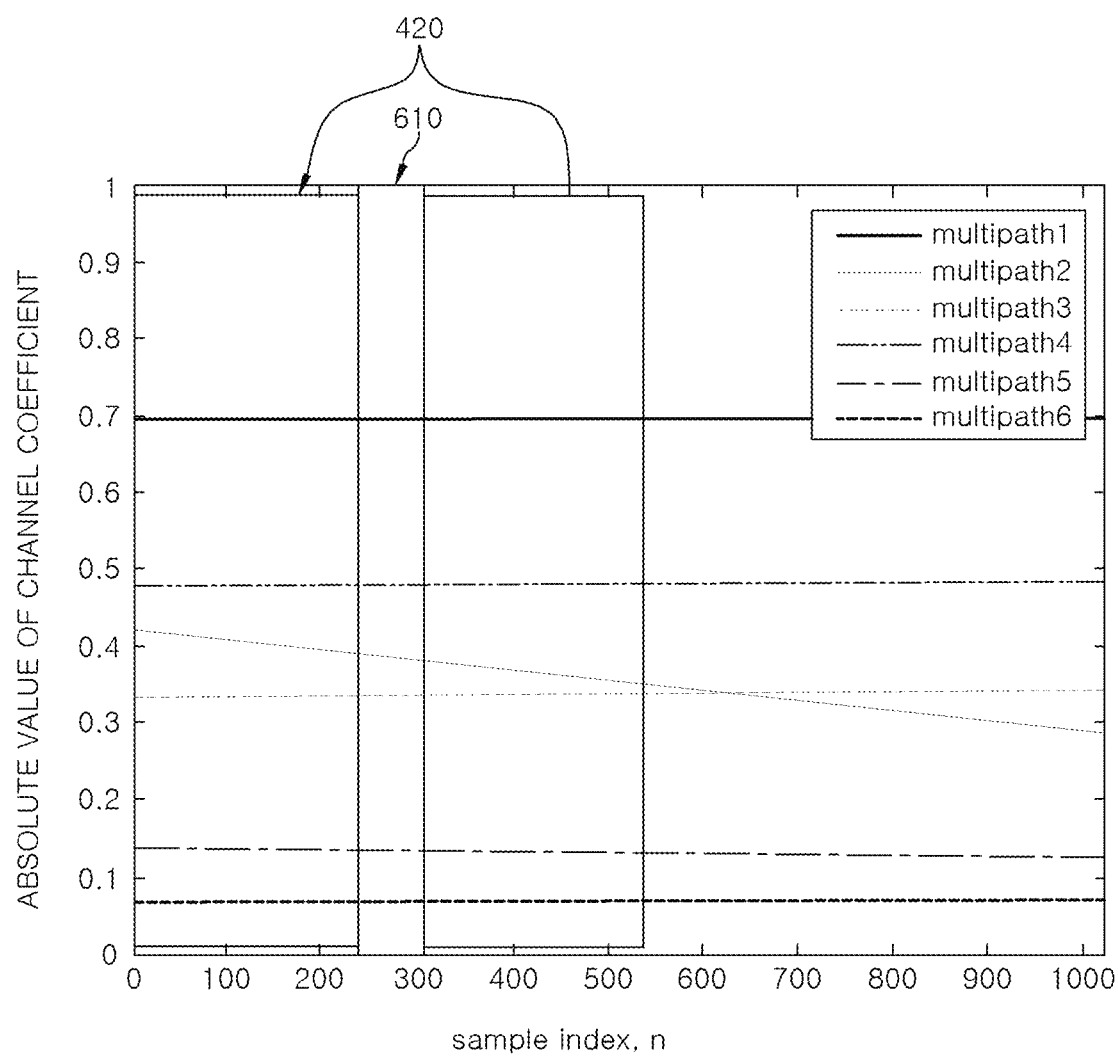
FIG. 6 is a diagram illustrating that an SC-FDE frame structure according to an embodiment of the present disclosure is advantageous for channel estimation when the moving speed is 60 km/H.

FIG. 4 is a diagram illustrating change in channel coefficient in an existing SC-FDE frame structure when a moving speed is 20 km/H, FIG. 5 is a diagram illustrating change in channel coefficient in an existing SC-FDE frame structure when a moving speed is 60 km/H, and FIG. 6 is a diagram illustrating that the SC-FDE frame structure according to the embodiment of the present disclosure is advantageous for channel estimation when the moving speed is 60 km/H.

Referring to FIGS. 4 and 5, it can be seen that a magnitude of the channel coefficient appears in an order of average powers of multipath components, and when the moving speed is high, a speed of change in the multipath component is also high. In particular, in the case of FIG. 5, it can be seen that a second multipath component is changing rapidly over time and that a fairly severe change occurs even within a 512 sample section. In this case, when the channel is estimated using pilot sections 410 and 520 located on the front side of the SC-FDE frame, a significant difference may occur between an actual channel and the estimated channel in a rear section of traffic data sections 420 and 520. However, when the channel is estimated by disposing the pilot section 610 in the middle of the SC-FDE frame as in FIG. 6, a time difference between the pilot section 610 and the traffic data section 620 is reduced, and thus, it is possible to estimate the channel more accurately. Therefore, when the SC-FDE frame structure according to the embodiment of the present disclosure is used, since the performance can be maintained without reducing the FFT size and transmission efficiency can be high even in the high-speed mobile environment, a low MCS can be used.

Figure 7:
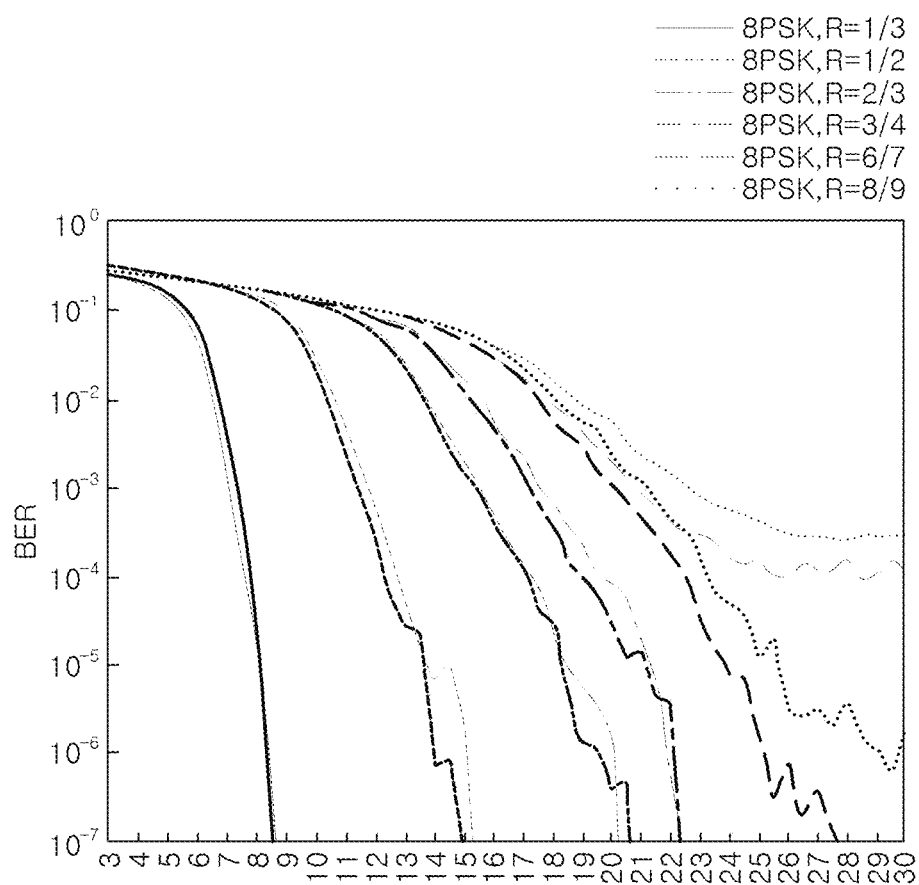
FIG. 7 is a diagram illustrating reception performance when 8PSK is sed as a modulation scheme.
Figure 8:
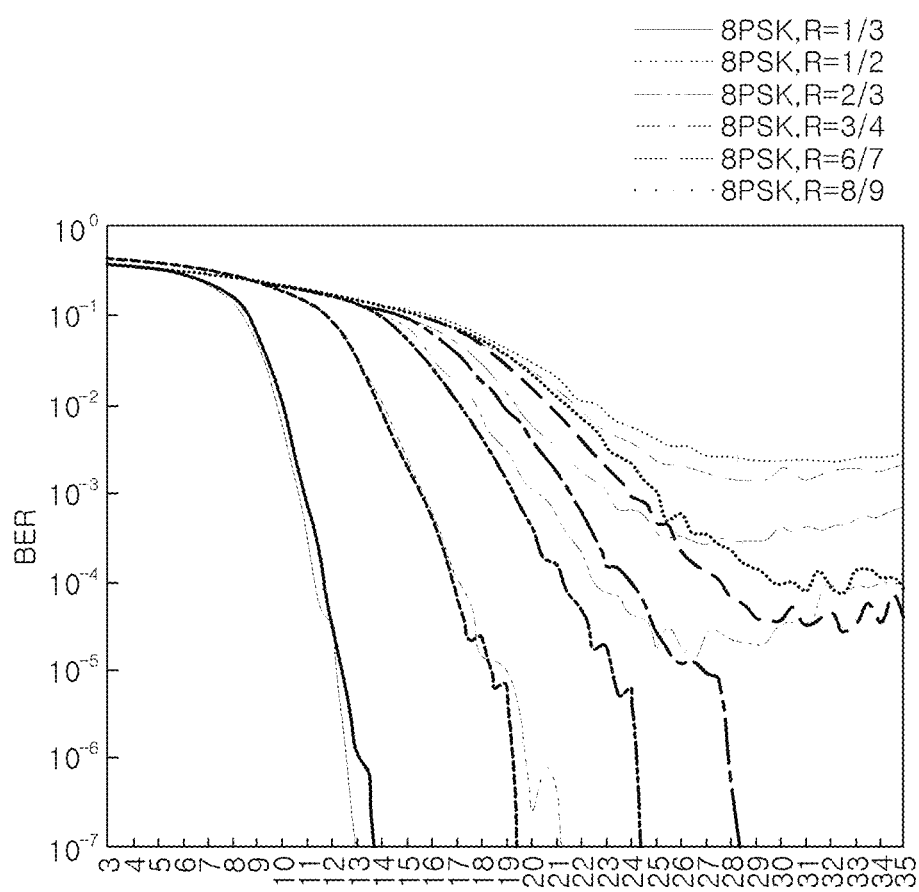
FIG. 8 is a diagram illustrating reception performance when 16QAM is used as the modulation scheme.

FIG. 7 is a diagram illustrating reception performance when 8PSK is used as a modulation scheme, and FIG. 8 is a diagram illustrating reception performance when 16QAM is used as the modulation scheme.

In FIG. 7, a bit error ratio (BER) performance for each channel code rate is illustrated when the modulation scheme is 8PSK and the movement speed is 60 km/H, and in FIG. 8, the BER performance for each channel code rate is illustrated when the modulation scheme is 16QAM and the movement speed is 60 km/H. In FIGS. 7 and 8, a thick line indicates a case in which the SC-FDE frame structure according to the embodiment of the present disclosure is applied, and a thin line indicates a case in which the existing SC-FDE frame structure as illustrated in FIG. 1 is applied.

Referring to FIG. 7, when the channel code rate is 6/7, a BER floor occurs in the existing frame structure, causing a problem in which BER is not improved no matter how high the signal to noise ratio (SNR) is, whereas it can be seen that BER=$10^{-7}$ can be obtained at SNR=28 dB when the frame structure according to the present disclosure is applied.

Further, referring to FIG. 8, when the channel code rate is 2/3, 3/4, 6/7, and 8/9, the BER floor occurs in the existing frame structure, causing a problem in which BER is not improved no matter how high the SNR is, whereas, when the frame structure of the present disclosure is applied, it can be confirmed that normal reception is possible at channel code rates of 2/3 and 3/4, and the BER floor occurs only at 6/7 and 8/9. This result means that reception performance is improved in the high-speed mobile environment when the SC-FDE frame structure according to the present disclosure is used.

Figure 9:
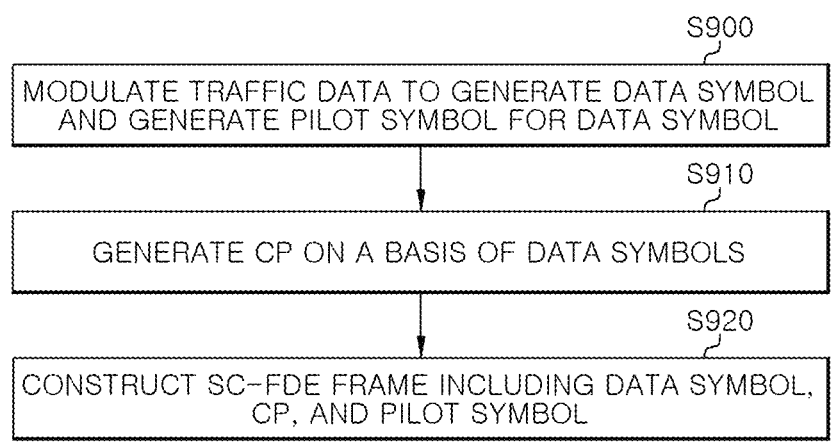
FIG. 9 is a diagram illustrating a transmission method in the single carrier-based wireless communication system according to the embodiment of the present disclosure.

FIG. 9 is a diagram illustrating a transmission method in the single carrier-based wireless communication system according to the embodiment of the present disclosure.

Referring to FIG. 9, the transmission device in the single carrier-based wireless communication system may modulate traffic data to generate a data symbol and generate a pilot symbol for the data symbol (S900). To this end, as an example, the transmission device may map the traffic data to a constellation according to a preset modulation scheme to generate the data symbols and/or the pilot symbol. Here, the modulation scheme may include PSK, QAM, or the like.

Meanwhile, the transmission device may generate the CP on the basis of the data symbols (S910). Here, the data symbols can be divided into two groups. The first group may include the first data symbols, and the second group may include the second data symbols. The number of first data symbols in the first group and the number of second data symbols in the second group may be the same. As an example, the transmission device may generate the CP using a rear part of the second data symbols in the second group. The CP may be included in a beginning of the SC-FDE frame to prevent inter-symbol interference.

The transmission device may construct the SC-FDE frame including the data symbol, the CP, and the pilot symbol (S920) and transmit the SC-FDE frame to the reception device. For example, when the transmission device constructs the SC-FDE frame, the transmission device may dispose the pilot symbol between the first data symbol and the second data symbol. That is, the transmission device may construct or reconstruct the SC-FDE frame so that the SC-FDE frame sequentially includes the CP, the first data symbol, the pilot symbol, and the second data symbol. Accordingly, the pilot symbol may be transmitted after the CP and the first data symbol are transmitted and before the second data symbol is transmitted.

Figure 10:
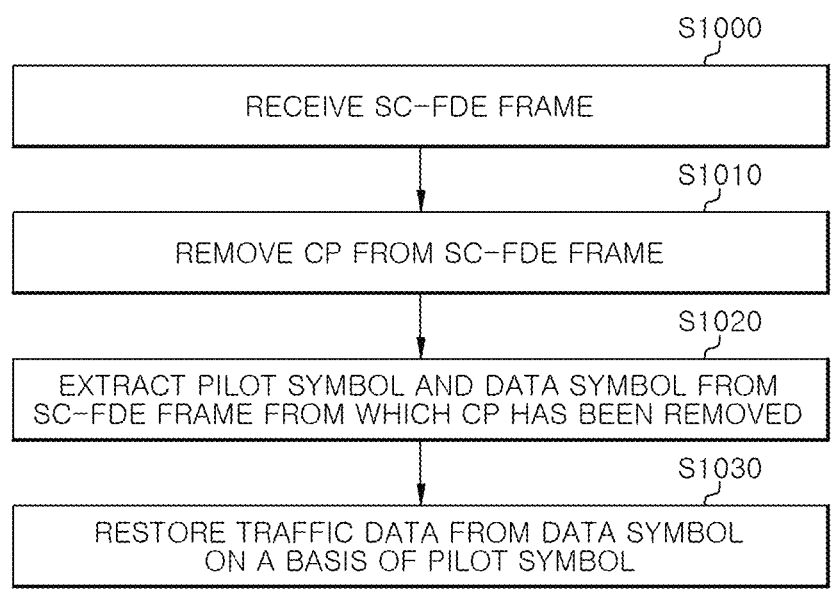
FIG. 10 is a diagram illustrating a reception method in the single carrier-based wireless communication system according to the embodiment of the present disclosure.

FIG. 10 is a diagram illustrating a reception method in the single carrier-based wireless communication system according to the embodiment of the present disclosure.

Referring to FIG. 10, when an SC-FDE frame is received from a transmission device (S100), the reception device may remove the CP from the SC-FDE frame (S1010).

Then, the reception device can extract the pilot symbol and the data symbol from the SC-FDE frame from which the CP has been removed (S1020). Here, the data symbol may include a first data symbol and a second data symbol. In this case, the SC-FDE frame may sequentially include the CP, the first data symbol, the pilot symbol, and the second data symbol, and the reception device may separate and extract the first data symbol, the pilot symbol, and the second data symbol from the SC-FDE frame from which the CP has been removed.

The reception device can restore the traffic data from the data symbol on the basis of the pilot symbol extracted from the SC-FDE frame (S1030). As an example, the reception device may derive the channel coefficient in the time domain on the basis of the pilot symbol, and derive the channel compensation coefficient in the frequency domain on the basis of the channel coefficient in the time domain. The FFT can be performed on the data symbol, and the channel compensation coefficient can be reflected in the data symbol subjected to the FFT processing so that the influence of the channel can be removed.

The reception device may perform IFFT on the data symbol in which the channel compensation coefficient has been reflected, to generate a channel-compensated data symbol in the time domain, and extract the traffic data from the data symbol.

Meanwhile, the reception method performed by the transmission device or reception device according to the above-described embodiment or the respective steps included in the reception method may be implemented in a computer program recorded on a recording medium, including instructions for causing a processor to perform these steps.

Further, the transmission method performed by the transmission device or reception device according to the above-described embodiment or the respective steps included in the transmission method may be implemented in a computer-readable recording medium on which a computer program including instructions for causing a processor to perform these steps has been recorded.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A data transmitting apparatus of a single carrier-based wireless communication system, the apparatus comprising:
a transceiver;
a memory configured to store one or more instructions; and
a processor configured to execute the one or more instructions to:
generate data symbols by modulating traffic data;
generate a cyclic prefix (CP) on the basis of the data symbols; and
generate a pilot symbol for the data symbols,
wherein the transceiver is configured to transmit a single carrier frequency domain equalizer (SC-FDE) frame including the data symbols, the CP, and the pilot symbol,
wherein the data symbols include first data symbols and second data symbols, and
wherein the pilot symbol is configured to be transmitted after transmission of the first data symbols and before transmission of the second data symbols.

2. The data transmitting apparatus of claim 1, wherein a number of the first data symbols is equal to that of the second data symbols.

3. The data transmitting apparatus of claim 1, wherein the data symbols are divided into the first data symbols and the second data symbols, and
wherein the pilot symbol is disposed between the first data symbols and the second data symbols in the SC-FDE frame.

4. The data transmitting apparatus of claim 1, wherein the processor is configured to generate the CP on the basis of the second data symbols.

5. The data transmitting apparatus of claim 1, wherein the transceiver is configured to construct the SC-FDE frame so that the SC-FDE frame sequentially includes the CP, the first data symbols, the pilot symbol, and the second data symbols.

6. A data transmitting method to be performed by a data transmitting apparatus of a single carrier-based wireless communication system, the method comprising:
generating data symbols by modulating traffic data and generating a pilot symbol for the data symbols;
generating a cyclic prefix (CP) on the basis of the data symbols; and
generating a single carrier frequency domain equalizer (SC-FDE) frame including the data symbols, the CP, and the pilot symbol,
wherein the data symbols include first data symbols and second data symbols, and
wherein the pilot symbol is transmitted after transmission of the first data symbols and before transmission of the second data symbols.

7. The data transmitting method of claim 6, wherein a number of the first data symbols is equal to that of the second data symbols.

8. The data transmitting method of claim 6, wherein the CP is generated on the basis of the second data symbols.

9. The data transmitting method of claim 6, further comprising,
dividing the data symbols into the first data symbols and the second data symbols,
wherein the pilot symbol is disposed between the first data symbols and the second data symbols in the SC-FDE frame.

10. The data transmitting method of claim 6, wherein the transmitting includes generating the SC-FDE frame including the CP, the first data symbols, the pilot symbol, and the second data symbols which are sequentially arranged in the SC-FDE frame.

11. A data receiving apparatus of a single carrier-based wireless communication system, the apparatus comprising:
a transceiver configured to receive a single carrier frequency domain equalizer (SC-FDE) frame;
a memory configured to store one or more instructions; and
a processor configured to execute the one or more instructions to:
remove a cyclic prefix (CP) from the SC-FDE frame;
extract a pilot symbol and data symbols from the SC-FDE frame from which the CP has been removed; and
restore traffic data from the data symbols on the basis of the pilot symbol,
wherein the data symbols include first data symbols and second data symbols, and
wherein the pilot symbol is configured to be received after reception of the first data symbols and before reception of the second data symbols.

12. The data receiving apparatus of claim 11, wherein a number of the first data symbols is equal to that of the second data symbols.

13. The data receiving apparatus of claim 11, wherein the processor is configured to separate the pilot symbol, the first data symbols, and the second data symbols from the SC-FDE frame from which the CP has been removed.

14. The data receiving apparatus of claim 11, wherein the SC-FDE frame sequentially includes the CP, the first data symbols, the pilot symbol, and the second data symbols.

* * * * *